(12) United States Patent
Buescher, Jr. et al.

(10) Patent No.: US 11,503,147 B2
(45) Date of Patent: Nov. 15, 2022

(54) NEAR FIELD COMMUNICATIONS ACTIVATED DOOR ACCESS PANEL

(71) Applicant: Overhead Door Corporation, Lewisville, TX (US)

(72) Inventors: Brent Buescher, Jr., Wooster, OH (US); James Emery Midyette, III, Millersburg, OH (US)

(73) Assignee: Overhead Door Corporation, Lewisville, TX (US)

(*) Notice: Subject to any disclaimer, the term of this patent is extended or adjusted under 35 U.S.C. 154(b) by 0 days.

(21) Appl. No.: 17/203,494

(22) Filed: Mar. 16, 2021

(65) Prior Publication Data

US 2021/0227066 A1 Jul. 22, 2021

Related U.S. Application Data

(63) Continuation of application No. 15/151,718, filed on May 11, 2016, now Pat. No. 10,979,553.

(Continued)

(51) Int. Cl.
*H04W 4/00* (2018.01)
*H04W 52/02* (2009.01)
*G05B 19/00* (2006.01)
*G07C 9/00* (2020.01)
*H04M 1/725* (2021.01)
*H04W 12/08* (2021.01)
*H04W 4/80* (2018.01)
*H04B 5/00* (2006.01)
*H04M 1/72415* (2021.01)

(52) U.S. Cl.
CPC ......... *H04M 1/72415* (2021.01); *H04W 4/80* (2018.02); *H04W 12/08* (2013.01); *H04W 52/027* (2013.01); *H04B 5/0031* (2013.01); *H04M 2250/04* (2013.01); *Y02D 30/70* (2020.08)

(58) Field of Classification Search
CPC . H04M 1/72533; H04M 1/725; H04W 4/008; H04W 12/06; H04W 52/027; H04W 52/02; H04B 5/0031; H04B 5/00; Y02B 60/50
See application file for complete search history.

(56) References Cited

U.S. PATENT DOCUMENTS 5,517,187 A 5/1996 Bruwer et al.
6,667,684 B1 12/2003 Waggamon et al.
(Continued)

OTHER PUBLICATIONS

Ben Miller, How to Open Your Garage Door With RFID, Sep. 27, 2013, 14 pgs., website at https://computers.tutsplus.com/articles/how-to-open-your-garage-door-with-rfid-mac-54164, captured Nov. 22, 2016.

*Primary Examiner* — Pablo N Tran
(74) *Attorney, Agent, or Firm* — Haynes and Boone, LLP

(57) ABSTRACT

Disclosed herein is an access control apparatus for a barrier movement system that moves a barrier. The access control apparatus includes a near field communications (NFC) module, a radiofrequency (RF) module, and a controller coupled to the NFC module and RF module. The controller is configured to read an NFC signal from an authenticated external device, via the NFC module. In response to reading the NFC signal, the controller transmits a command signal, via the RF module, that commands the barrier movement system to move the barrier.

20 Claims, 3 Drawing Sheets

Related U.S. Application Data

(60) Provisional application No. 62/162,474, filed on May 15, 2015.

(56) References Cited

U.S. PATENT DOCUMENTS

| | | | |
|---|---|---|---|
| 7,296,607 | B2 | 11/2007 | Krupke et al. |
| 7,498,936 | B2 | 3/2009 | Maeng |
| 8,175,591 | B2 | 5/2012 | Fitzgibbon |
| 8,836,469 | B2 | 9/2014 | Fitzgibbon |
| 8,842,829 | B2 | 9/2014 | Bresson |
| 9,054,961 | B1 | 6/2015 | Kim |
| 9,373,208 | B2 * | 6/2016 | Candelore .......... G07C 9/00182 |
| 9,407,624 | B1 | 8/2016 | Myers |
| 9,449,449 | B2 | 9/2016 | Evans |
| 9,698,997 | B2 | 7/2017 | Arteaga-King |
| 2007/0060056 | A1 * | 3/2007 | Whitaker .......... H04M 1/72415 455/41.2 |
| 2010/0159846 | A1 * | 6/2010 | Witkowski ......... G07C 9/00857 455/70 |
| 2012/0075059 | A1 * | 3/2012 | Fyke .................. G07C 9/00857 340/5.21 |
| 2013/0142269 | A1 * | 6/2013 | Witkowski ........... H04B 7/0689 375/259 |
| 2013/0147600 | A1 | 6/2013 | Murray |
| 2013/0173928 | A1 | 7/2013 | Yen |
| 2013/0314226 | A1 * | 11/2013 | Zhang .................... F24C 7/082 340/539.11 |
| 2014/0184393 | A1 | 7/2014 | Witkowski |
| 2015/0221147 | A1 | 8/2015 | Daniel-Wayman |
| 2015/0235493 | A1 | 8/2015 | Hall |

* cited by examiner

NEAR FIELD COMMUNICATIONS ACTIVATED DOOR ACCESS PANEL

PRIORITY CLAIM

This application is a continuation of U.S. patent application Ser. No. 15/151,718 filed on May 11, 2016; which claims the priority benefit of Provisional Patent Application No. 62/162,474 filed on May 15, 2016, the contents of which are hereby incorporated by reference in their entirety to the maximum extent allowable by law.

TECHNICAL FIELD

The present invention relates generally to remote operated barrier operator systems, and more particularly to the use of near field communications (NFC) in connection therewith.

BACKGROUND

Movable barriers, such as upward acting sectional or single panel garage doors, residential and commercial rollup doors, and slidable and swingable gates, are used to alternatively allow and restrict entry to building structures and property. These barriers are driven between their respective open and closed positions by coupled barrier moving units, known and referred to in the trade as "barrier operators", and in the specific case of a garage door, known and referred to as "garage door operators."

For example, a typical garage door operator for driving an upward acting sectional garage door between its open and closed positions includes, as a central control unit, a door control module or "head" unit including a microcontroller for (i) processing incoming user actuated door instructions and (ii) generating output control signals corresponding to these instructions; a motor controller for receiving and transmitting these control signals to a motor; and a DC or AC motor drivingly coupled to the garage door. The user actuated door instructions are in the form of wired or wireless signals typically transmitted to the microcontroller from wall consoles mounted at the interior and exterior of the garage, hereinafter referred to as "access panels", or from hand held or vehicle mounted RF transmitters.

Activation of a barrier operator so as to cause a barrier to be driven between the open and closed positions via an exterior access panel can be particularly convenient for users. For example, the barrier may be opened without the need for the user to carry an RF transmitter. These exterior access panels typically utilize a keypad into which a user must enter a personal identification code in order for the barrier operator to be enabled to cause the barrier to be driven between the open and closed positions.

While such exterior access panels are m wide use and add convenience for users, additional functionality is still desirable. For example, a user may have forgotten their personal identification code and not have their RF transmitter in their immediate possession. Consequently, further developments in exterior access panels for activating a barrier operator, such as a garage door opener, to accommodate those and other situations are desirable. For example, other ways of causing exterior access panels to enable the barrier operator are desirable.

As known to those of skill in the art, near field communications (NFC) is a form of short-range wireless communication in which an NFC antenna is used. An NFC antenna is much smaller than the wavelength of the carrier signal, thus preventing a standing wave from developing within the antenna. In the near-field, typically considered to be one quarter of a wavelength or less, the antenna can produce either an electric field, or a magnetic field, but not an electromagnetic field. Thus, near field communications are either by way of a modulated electric field, or a modulated magnetic field, but not by a modulated electromagnetic wave.

The NFC technology has recently expanded to smartphones, smartphones typically using electric field NFC, operating at a frequency of 13.56 MHz, corresponding to a wavelength of 22.11 m, for secure communications. Therefore, NFC technology is particularly useful for smartphone communication because the very short range of NFC makes it difficult for eavesdroping. In operation, the NFC antenna sets up the near-field around itself, with length, width and depth of the field being roughly the same as the dimensions of the NFC antenna. Thus, the NFC antenna produces a stationary electric field pulsating at 13.56 MHz. If another similarly small NFC antenna comes into this electric field, it will induce an electric potential into it, alternating at the same frequency. By modulating the signal in the NFC antenna, a signal is thus transmitted to the passive, receiving NFC antenna.

It is therefore the principal object of this invention to utilize the benefits of near field communication technology to improve the ability to obtain remote access to a garage or other building structure.

SUMMARY

Disclosed herein is an access control apparatus for a barrier movement system that moves a barrier. The access control apparatus includes a near field communications (NFC) module, a radiofrequency (RF) module, and a controller coupled to the NFC module and RF module. The controller is configured to read an NFC signal from an authenticated external device, via the NFC module. In response to reading the NFC signal, the controller transmits a command signal, via the RF module, that commands the barrier movement system to move the barrier.

Another aspect is directed to electronic device for communication with an access control apparatus for a barrier movement system that moves a barrier. The access control apparatus includes a near field communications (NFC) module, a radiofrequency (RF) module, and a controller coupled to the NFC module and RF module. The controller is configured to read an NFC signal, via the NFC module, and in response to reading the NFC signal and receiving a user command, transmit a command signal, via the RF module, that commands the barrier movement system to move the barrier. The electronic device includes a near field communications (NFC) module, a wireless data module, and a controller coupled to the NFC module and the wireless data module. The controller is configured to activate the NFC module to transmit the NFC signal to the access control apparatus, and send the user command to the access control apparatus, using the wireless data module.

A method aspect is directed to a method of moving a barrier that includes bringing an authenticated near field communications (NFC) device within communications distance of an access control apparatus that reads a NFC signal emitted from the authenticated NFC device, and in response to the NFC signal, transmits a command signal that commands a barrier movement system to move the barrier.

Another method aspect is directed to a method of operating an access control apparatus for a barrier movement system that moves a barrier including reading a near field communications (NFC) signal from an authenticated external device, using a NFC module. A command signal that commands the barrier movement system to move the barrier is transmitted, using a radiofrequency (RF) module.

DETAILED DESCRIPTION

One or more embodiments of communication systems in accordance with the principles of the present invention will be described below. These described embodiments are only examples of techniques to implement the invention, as defined solely by the attached claims. Additionally, in an effort to provide a focused description of the invention and the principles of the invention, minor features of an actual implementation may not be described in the specification.

Figure 1:
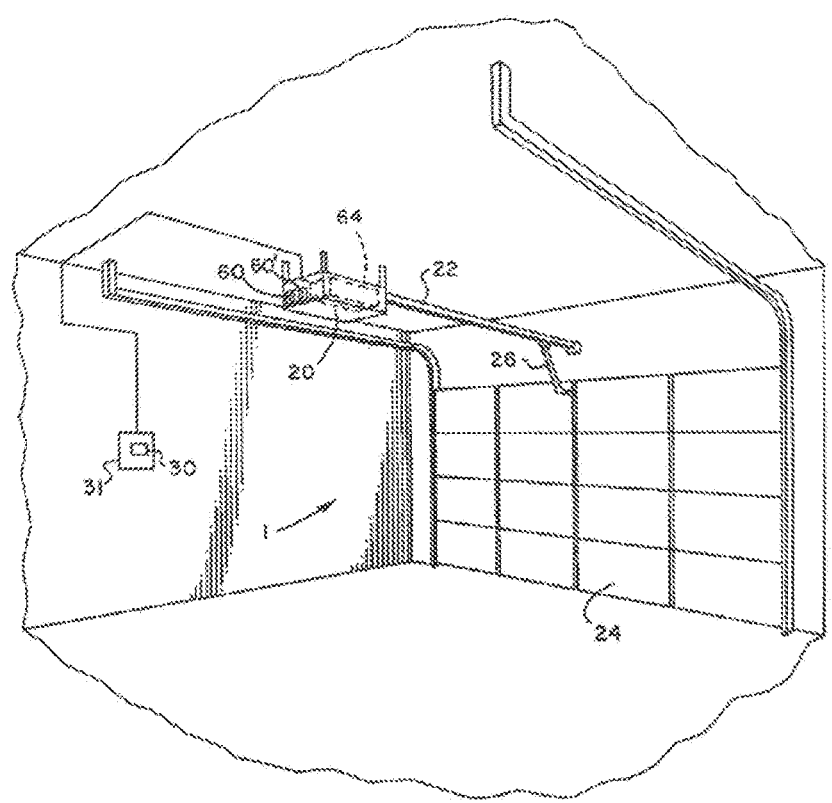
FIG. 1 shows an interior perspective of a residential garage diagrammatically illustrating a typical system for opening and closing the garage door.

FIG. 1 shows an embodiment of a typical garage door operator, or remote-controlled garage door opener system 1 used for proximately (or remotely) activating (opening and closing) a garage door. The system 1 includes a garage door operator, the principal component in this embodiment of which is a door control module or head unit 20 normally suspended from the ceiling of the garage. A rail 22 extends from head unit 20 and is secured to the wall above the garage door 24. One end of a door arm 26 is joined to the garage door 24, and an opposed end of the door arm 26 is adapted to reciprocate along the length of the rail 22. The head unit 20 includes a drive mechanism 64, as is known in the art, for reciprocatively moving a carriage (not shown) by chain, belt, or screw drive along the rail 22, thus respectively opening and closing the garage door 24. The control module or head unit 20 also includes a controller 131 (see FIG. 3), constituting a microcontroller, microprocessor, system on a chip, programmable gate array or similar apparatus that, upon receipt of user-actuated instruction signals, processes and outputs these instructions to the drive mechanism 64, thereby effectuating opening or closing of the garage door 24. Additional details of this type of garage door opener system are disclosed, for example, in U.S. Pat. No. 8,842,829, issued Sep. 23, 2014, assigned to the assignee of the present invention, and incorporated herein by reference for all purposes. Alternatively, the garage door opener system 1 may be of the jackshaft/counterbalance drive type known in the industry, an example of which is disclosed in U.S. Pat. No. 7,296,607, issued Nov. 20, 2007, assigned to the assignee of the present invention, and incorporated herein by reference for all purposes.

Figure 2:
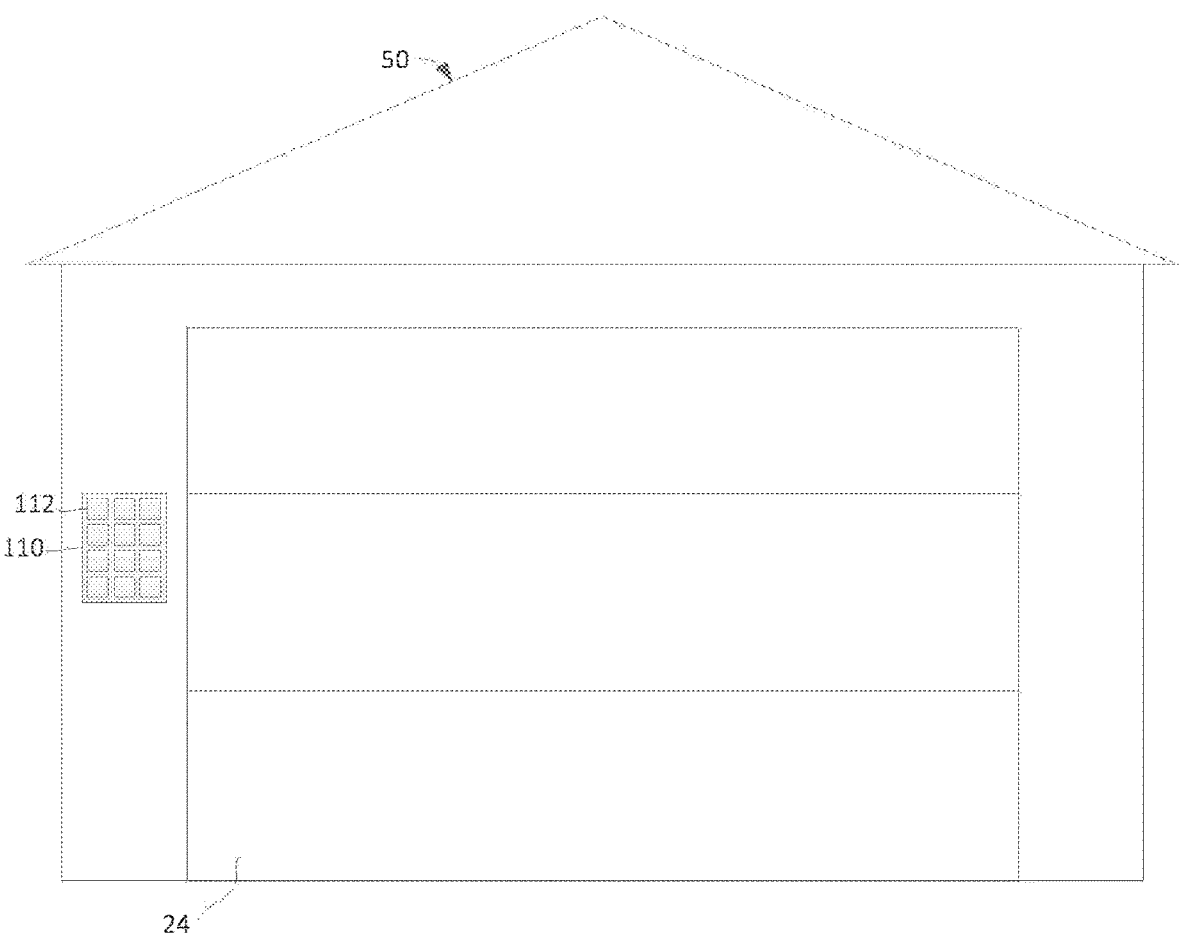
FIG. 2 shows an exterior front plan view of the residential garage of FIG. 1, showing an exterior access panel.

Referring again to the embodiment of FIG. 1, the user actuated instruction signals may originate from an interior located access panel 31, in wired connection with the controller of the head unit 20, by which user actuation of the button switch 30 of the access panel 31 instructs the opening or closing of the garage door 24. Alternatively, encoded radio frequency (RF) instructions may be transmitted to an antenna included within a RF module 133 in the head unit 20 (see FIG. 3), which is constituted by a RF receiver or RF transceiver, and in turn may be passed to the controller in the head unit 20. The RF instructions may originate from a hand-held or vehicle mounted transmitter, or from an exterior mounted access panel 110 (see FIG. 2).

Figure 3:
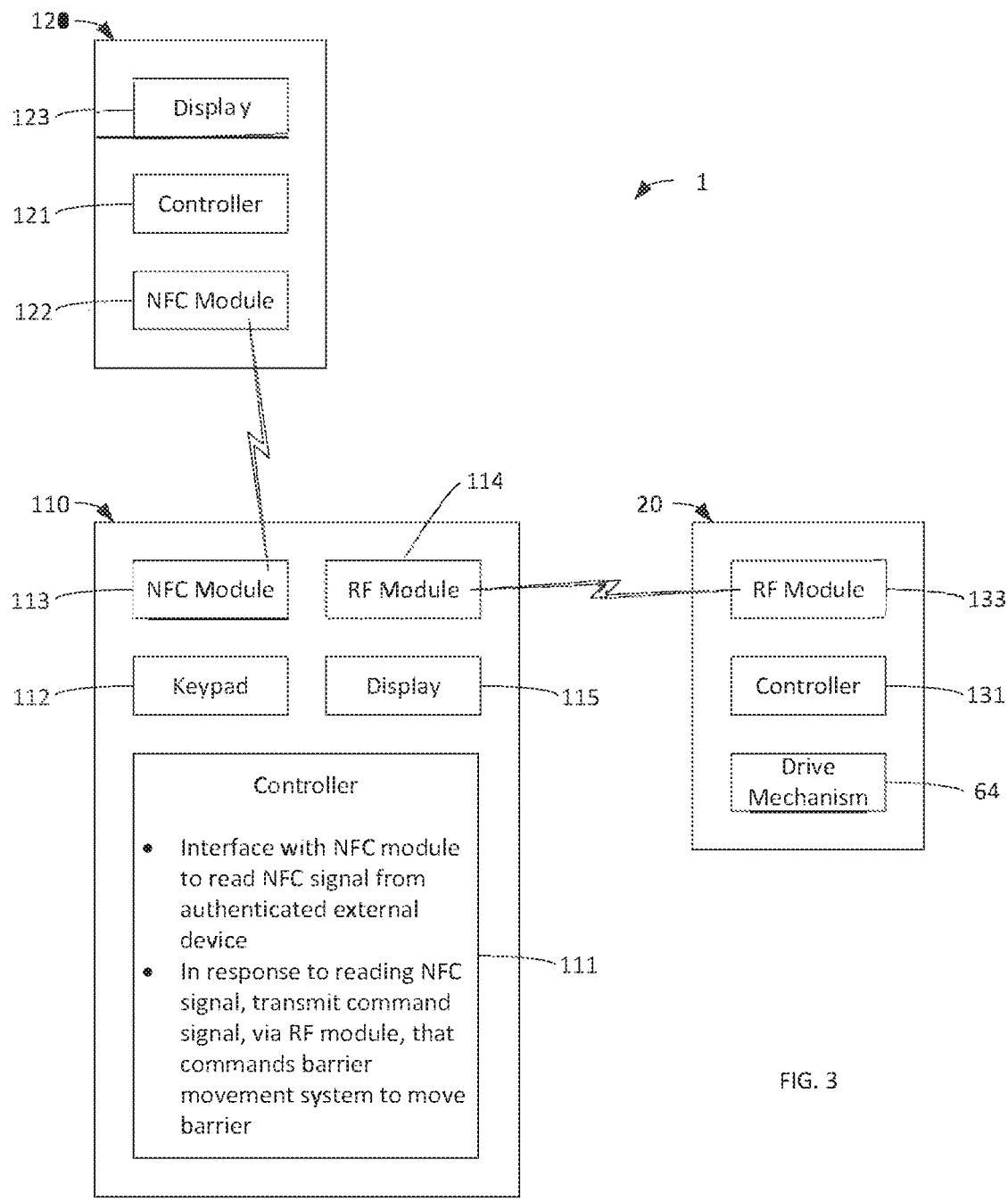
FIG. 3 is a schematic block diagram of the principal component parts of a system for opening the garage door in accordance with the present invention.

Referring again to FIG. 3, the exterior mounted access panel 110 includes a keypad 112, which includes a plurality of electrical switches, for accepting user entry of an access code. As illustrated in FIG. 3, the access panel 110 may optionally include a display 115, such as a LCD or seven segment panel, for displaying to the user the keys of the access code as entered, or a visual representation of how many keys have been pressed. A controller 111, such as a microcontroller, microprocessor, programmable gate array, or similar apparatus, is coupled to the keypad 112, and reads output from the electrical switches of the keypad 112. When an access code is entered into the keypad 112, the controller 111 compares the access code to one or more stored authorized access codes. If the entered access code matches a stored authorized access code, the controller 111 may cause the display 115 to display a message to the user indicating that the access code is authorized and has been accepted. When the entered access code matches a stored authorized access code, the controller 111 encodes user-actuated instructions to open or close the door, and actuates an RF module 114, which is a RF transmitter or RF receiver coupled to an antenna. The RF module 114 uses the antenna to transmit the encoded user-activated instructions as encoded user-actuated RF instructions to the RF module 133 in the head unit 20.

The encoded user-actuated RF instructions utilize an encrypted hopping code signal that changes with each transmission. The controller 111 of the access panel 110 therefore performs encryption, while the controller 131 of the head unit 20 is operable to decrypt the encrypted hopping code signal as received by its RF module 133 and to activate drive mechanism 64 when the decrypted signal properly identifies the transmission as having come from the access panel 110. The encoding and decoding functions respectively performed by the controller 111 of the access panel 110 and controller 131 of the head unit 20 employ variations of the code hopping technique disclosed in U.S. Pat. No. 5,517,187 to Bruwer, et al., which by this reference is incorporated herein in its entirety. These variations of the code hopping technique are disclosed in U.S. Pat. No. 6,667,684 to Wagaman et al., and in U.S. Pat. No. 8,842,829 to Bresson et al., both of which are hereby incorporated by reference to the maximum extent allowable under the law.

The access panel 110 includes a NFC module 133, which is comprised of a NFC antenna and a NFC receiver or NFC transceiver. The NFC module 133 enables the access panel 110 to communicate with a smartphone 120. The smartphone 120 includes a controller 121, which may be a system on a chip, microcontroller, microprocessor, or other suitable apparatus, coupled to a NFC module 122, and to a touch sensitive display 123 that also acts as an input device. The NFC module 122 includes a NFC antenna coupled to a NFC transceiver, while the touch sensitive display 123 includes a display layer, and a capacitive sensing layer associated with the display layer.

The invention described herein specifically relies on the use of the NFC module 133 for actuation of the access panel 110 and subsequent causing of the access panel 110 to transmit the encoded instructions to the head unit 20. Accordingly, details of improvements to the system 1, in accordance with the principles of the present invention, are now described.

The smartphone 120 and the access panel 110 are initially "paired" through a NFC communication between their respective NFC modules 113, 122 and the entering of an authorized personal identification number into the keypad 112 of the access panel 110, and potentially into the touch sensitive display 123 of the smartphone 120. Once the smartphone 120 and access panel 110 are paired, the smartphone 120 is then considered to be authorized.

A subsequent NFC communication between the respective NFC modules 113, 122 causes the controller 111 to transmit the encoded user-actuated RF instructions using the RF module 114, so as to command the head unit 20 to open or close the garage door 24. If the controller 111 of the access panel 110 does not recognize the smartphone 120 as being authorized, it will not open or close the garage door 24 based upon NFC communication, thereby disallowing unauthorized access to the interior of the structure bounded by the garage door 24.

In some applications, the controller 111 of the access panel 110 is configured to only cause the RF module 114 to transmit the encoded user-actuated RF instructions during a certain interval of time. That is, if a NFC communication is initiated between the NFC modules 113, 122 during the interval of time (i.e. between 9 am and 5 pm), the controller 111 of the access panel 110 will cause the RF module to transmit the encoded user-actuated RF instructions, but if the NFC communication is initiated outside of that interval of time, the controller 111 of the access panel 110 will take no action. The interval of time may be programmed into the controller 111 of the access panel 110 via the keypad 112.

The controller 111 of the access panel 110 may additionally or alternatively be configured to only cause the RF module 114 to transmit the encoded user-actuated RF instructions on a certain day or days of the week, or on a certain date or dates. For example, if a NFC communication is initiated between the NFC modules 113, 122 on a Monday, the controller 111 of the access panel 110 will cause the RF module to transmit the encoded user-actuated RF instructions, but if the NFC communication is initiated on Tuesday, the controller 111 of the access panel 110 will take no action. As another example, if a NFC communication is initiated between the NFC modules 113, 122 on Jan. 2, 2015, the controller 111 of the access panel 110 will cause the RF module to transmit the encoded user-actuated RF instructions, but if the NFC communication is initiated on Jan. 1, 2015, the controller 111 of the access panel 110 will take no action. The day or days of the week, or date or dates, may be programmed into the controller 111 via the keypad 112.

Those skilled in the art will appreciate that the time intervals and day of week or date restrictions may be utilized in tandem. Thus, the controller 111 may be configured to only cause the RF module to transmit the encoded user-actuated RF instructions if the NFC communication is initiated between 9 am and 5 pm on a weekday, for example.

Those skilled in the art will also appreciate that different smartphones 120 may be paired to the access panel 110, and that such different smartphones may have different access limitations. For example, the controller 111 may be configured to cause the RF module to transmit the encoded user-actuated RF instructions if the NFC communication is initiated at any time by a first smartphone 120, but to only cause the RF module to transmit the encoded user-actuated RF instructions if the NFC communication is initiated during a certain interval of time, or on a certain day or days, or on a certain date or dates, if the NFC communications is initiated by a second smartphone.

Although the foregoing description has described the system 1 with reference to a smartphone 120 being used to actuate the access panel 110, it should be understood that any device with a NFC module may be authenticated and used with the system once authenticated. For example, an unpowered NFC token or NFC sticker may be used.

In some cases, the system 1 may operate on a dual authentication basis. In detail, after the NFC communication between the respective NFC modules 113, 122 takes place, a second user input must be provided in order for the controller 111 to transmit the encoded RF instructions to command the head unit 20 to open or close the garage door 24 using the RF module 114. The second user input may be provided by entering an authorized access code into the keypad 112, after which the controller 111 transmits the encoded RF instructions. As another example, the second user input may be provided by entering an access code into the smartphone 120 via its touch sensitive display 123, or by providing biometric information (such as a fingerprint or retina) to the smartphone 120. In this instance, the smartphone 120 may, without user input, prompt the user for either an access code or biometric information, in response to initiation of the NFC communication between the NFC modules 113, 122.

In some cases, the access panel 110 may be powered by a battery and may remain in a low power state until initiation of the NFC communication between the respective NFC modules 113, 122, at which point the access panel 110 transitions into a normal operating mode until at least completion of transmission of the encoded RF instructions by the controller 111.

In the low power state, the various components of the access panel 110 may be either off or in a low power mode. For example, in the low power state, the clock speed of the controller 111 may be reduced, the display 115 may be off, the RF module 114 may be off, a backlight of the display 115 or keypad 112 (if so equipped) may be off, and an indicator light (if so equipped) indicating whether the access panel 110 is operating in the normal operating state may be off.

After transition into the normal operating state, the various components of the access panel 110 that were either off or in a low power mode are placed into a normal operation state. Thus, for example, the clock speed of the controller 111 may be increased, the display 115 may be on, the RF module 114 may be on, a backlight of the display 115 or keypad 112 (if so equipped) may be on, and an indicator (if so equipped) indicating whether the access panel 110 is operating in the normal operating state may be on.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electronic device configured to communicate with an access control apparatus for a barrier movement system that moves a barrier, comprising:
    a first near field communications (NFC) module;
    a wireless data module; and
    a first controller coupled to the NFC module and the wireless data module and configured to:
        activate the NFC module to initiate NFC communication with the access control apparatus;
        prompt, without user input, input of a user command based upon initiation of the NFC communication;
        receive the user command; and
        send the user command to the access control apparatus.

2. The electronic device of claim 1, wherein the access control apparatus that the electronic device is configured to communicate with comprises a second NFC module, a radiofrequency (RF) module, and a second controller coupled to the second NFC module and RF module, wherein the second controller is configured to:
- receive the NFC communication, via the second NFC module;
- receive the user command via the second NFC module; and
- transmit, in response to receiving the NFC communication and receiving the user command, a command signal, via the RF module, that commands the barrier movement system to move the barrier.

3. The electronic device of claim 1, wherein the first controller is configured to automatically initiate the NFC communication in response to the electronic device being disposed within a NFC range of the access control apparatus.

4. The electronic device of claim 1, wherein the first controller comprises a system-on-a-chip.

5. The electronic device of claim 1, further comprising a touch sensitive display for prompting the input of the user command.

6. The electronic device of claim 5, wherein the first controller is further configured to receive a personal identification number via the touch sensitive display to pair the electronic device with the access control apparatus to authenticate the electronic device prior to initiation of the NFC communication.

7. The electronic device of claim 6, wherein the electronic device is further configured to be authenticated by entering the personal identification number into a keypad of the access control apparatus.

8. The electronic device of claim 5, wherein the user command is received by the electronic device as an access code input into the touch sensitive display.

9. The electronic device of claim 1, wherein the user command is received by the electronic device as input of biometric information.

10. The electronic device of claim 9, wherein the biometric information comprises a fingerprint.

11. The electronic device of claim 1, wherein the first controller is configured to send the user command to the access control apparatus via the wireless data module.

12. The electronic device of claim 11, wherein the wireless data module is configured to transmit the user command independent of the first NFC module.

13. An electronic device configured to communicate with an access control apparatus in operative communication with a garage door operator, comprising:
- a first near field communications (NFC) module;
- a display;
- a user input device;
- a wireless data module;
- a first controller coupled to the NFC module and the wireless data module and configured to:
  - initiate NFC communication with the access control apparatus via the first NFC module;
  - prompt, in response to the initiation of the NFC communication with the access control apparatus, a user to input a user command via the display;
  - receive the user command via the user input device; and
  - send the user command to the access control apparatus via the wireless data module.

14. The electronic device of claim 13, wherein the first NFC module is configured to communicate with a second NFC module of the access control apparatus in order to authenticate the electronic device to allow the user to activate the garage door operator.

15. The electronic device of claim 13, wherein the display comprises a touch sensitive display and user input device comprises a capacitive sensing layer of the touch sensitive display.

16. The electronic device of claim 15, wherein the first controller is further configured to receive a personal identification number via the touch sensitive display to pair the electronic device with the access control apparatus to authenticate the electronic device prior to initiation of the NFC communication.

17. The electronic device of claim 15, wherein the user command is received by the electronic device as an access code input into the touch sensitive display.

18. The electronic device of claim 13, wherein the user command is received by the electronic device as input of biometric information.

19. The electronic device of claim 18, wherein the biometric information comprises a fingerprint.

20. The electronic device of claim 1, wherein the first controller is configured to send the user command to the access control apparatus via the wireless data module and independent of the first NFC module.

\* \* \* \* \*